United States Patent [19]

Rubbmark

[11] Patent Number: 4,869,395

[45] Date of Patent: Sep. 26, 1989

[54] VENDING MACHINE WITH INTERCHANGEABLE MAGAZINES

[75] Inventor: Jan R. Rubbmark, Malmö , Sweden

[73] Assignee: Aktiebolaget Electrolux, Stockholm, Sweden

[21] Appl. No.: 189,212

[22] Filed: May 2, 1988

[30] Foreign Application Priority Data

May 19, 1987 [SE] Sweden ................................ 8702066

[51] Int. Cl.⁴ .............................................. B65G 59/06

[52] U.S. Cl. .................................... 221/131; 221/197; 221/287

[58] Field of Search ........................ 312/35, 45, 49, 72, 312/10; 221/154, 197, 130, 131, 132, 123, 124, 241, 242, 287

[56] References Cited

U.S. PATENT DOCUMENTS 4,243,145 1/1981 Woodhead ............................ 312/72

FOREIGN PATENT DOCUMENTS 2101982 1/1983 United Kingdom .

*Primary Examiner*—H. Grant Skaggs
*Attorney, Agent, or Firm*—Pearne, Gordon, McCoy & Granger

[57] ABSTRACT

A vending machine for supplying different articles, the articles being located in magazines which are detachably fixed in compartments of the cabinet. The articles are removable through a flap of each magazine and the magazines are individually removable through a front opening of the cabinet for refilling with new articles. The magazines are of at least one narrow and one wide type. Each compartment is arranged for accommodating at least two narrow magazines juxtaposed to each other. At least two of the narrow magazines are replaceable by a wide magazine, the width of which is substantially equal to the total width of the magazines it replaces.

3 Claims, 4 Drawing Sheets

52
34
30
26
64
62
38
60
58
36
46

52
30
28
34
52
64
46
38
62
60
58
36
46

68
66
64
62
60
70
66
64

52
34
30
32
40
38
46
36

VENDING MACHINE WITH INTERCHANGEABLE MAGAZINES

The invention relates to a cabinet for supplying different articles located in magazines which are detachably fixed in compartments of the cabinet, the articles being removable through a discharging device of each magazine and the magazines being individually removable through a front opening of the cabinet for refilling of new articles.

Such a cabinet is known through for example in Patent No. GB 2,101,982. In the known cabinet there are several narrow compartments arranged so that each of them accommodates a magazine of a narrow type suitable for supplying small articles, and a wide compartment arranged for accommodating a magazine of a wide type suitable for supplying large articles. In this way the number of small and large articles, that can be supplied by the cabinet, will be determined in advance by the number of small and wide compartments in the cabinet.

The principal feature of the invention is to make the cabinet flexible so that the number of small and large articles that can be supplied by the cabinet can be varied within wide limits.

This feature is accomplished; by the cabinet constructed according to the present invention whereby the magazines are of at least one narrow and one wide type, and in which each compartment is arranged to be able to accommodate at least two narrow magazines along side each other and that, alternatively, at least two of the narrow magazines can be replaced by one wide one, the width of which being substantially equal to the total width of the magazines it replaces.

Consequently, it will be possible to replace at least two magazines for small articles located adjacent to each other by a magazine for large articles.

Figure 2:
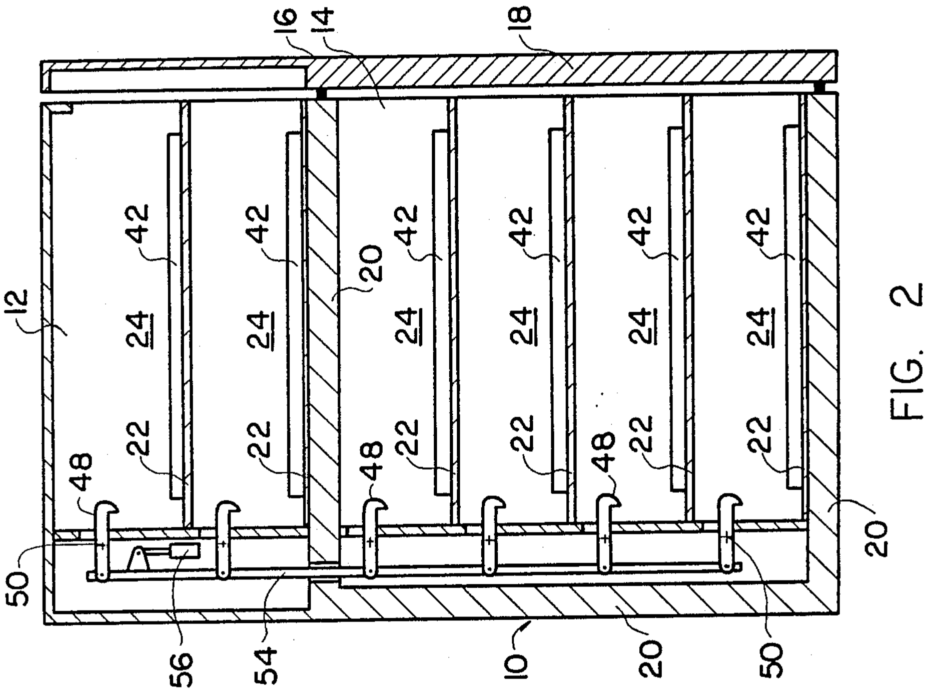
Figure 1:
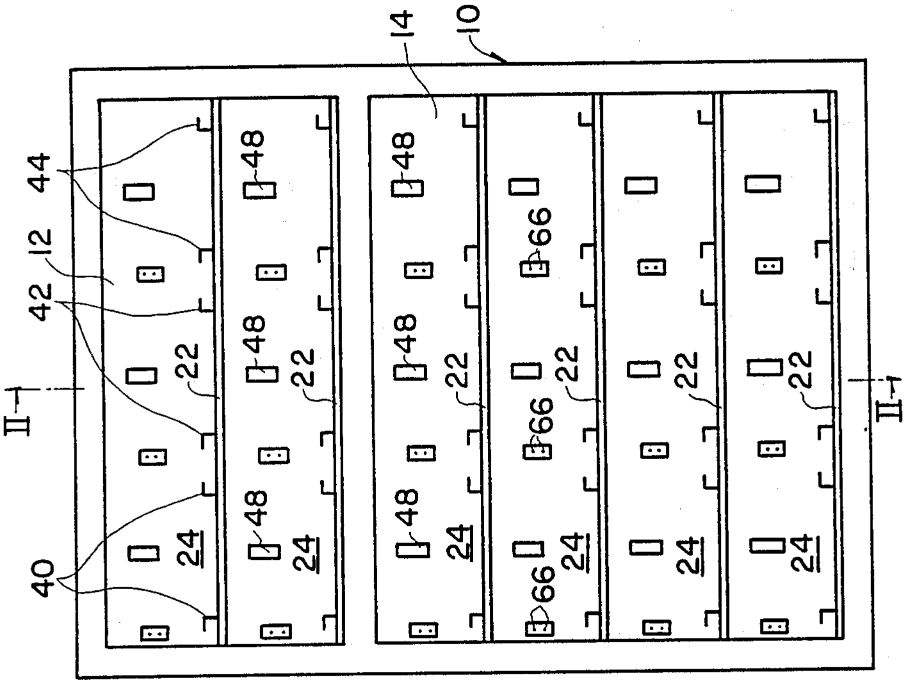
Figure 3:
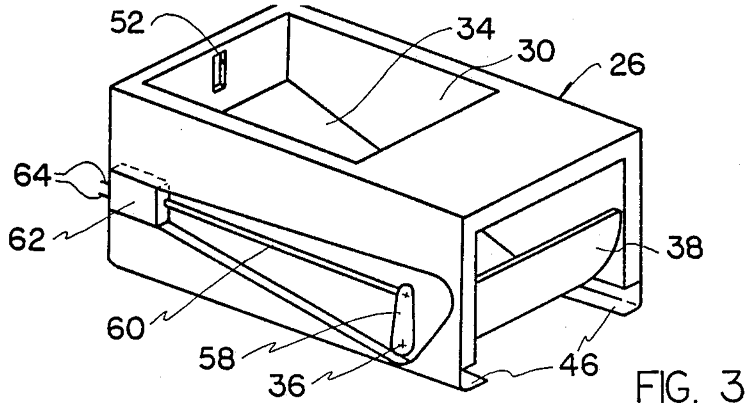
Figure 4:
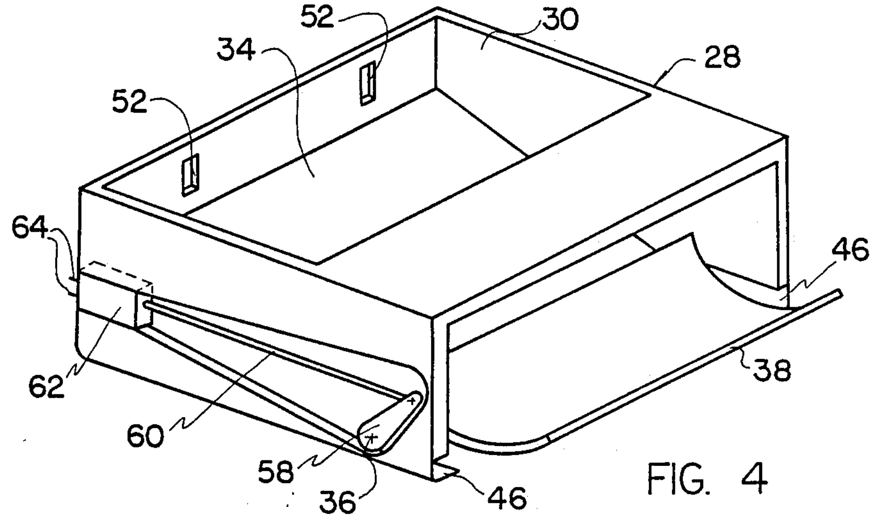
Figure 5:
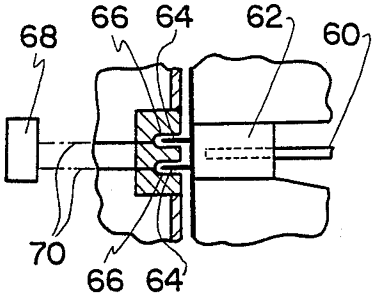
Figure 6:
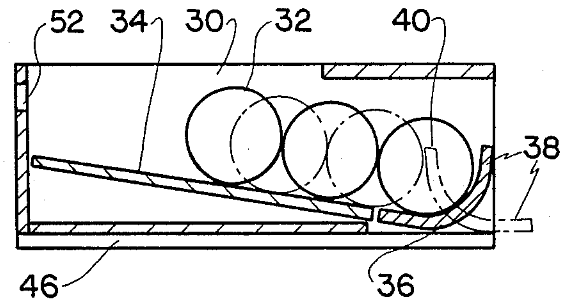
Figure 7:
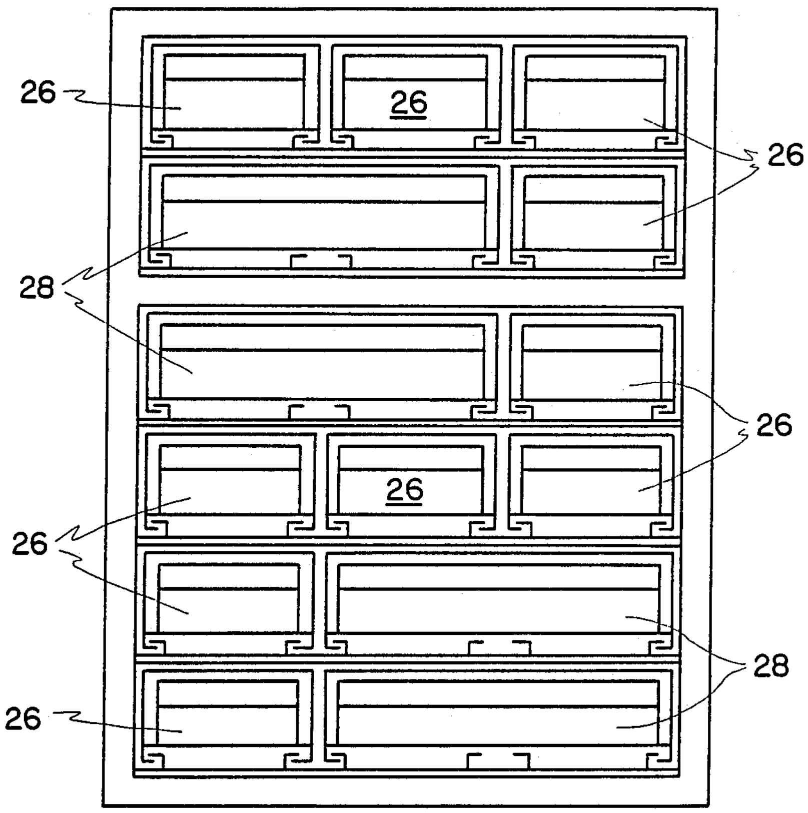
Figure 8:
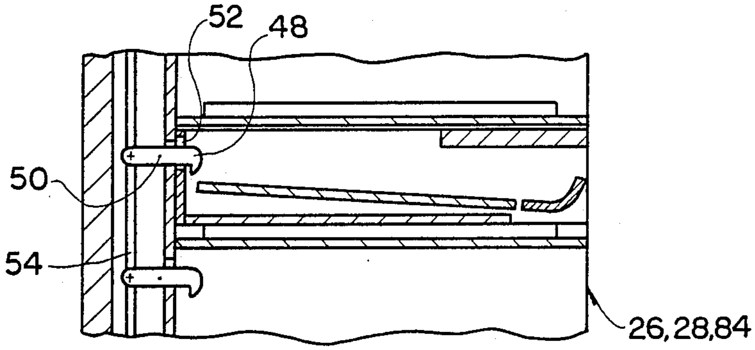
Figure 10:
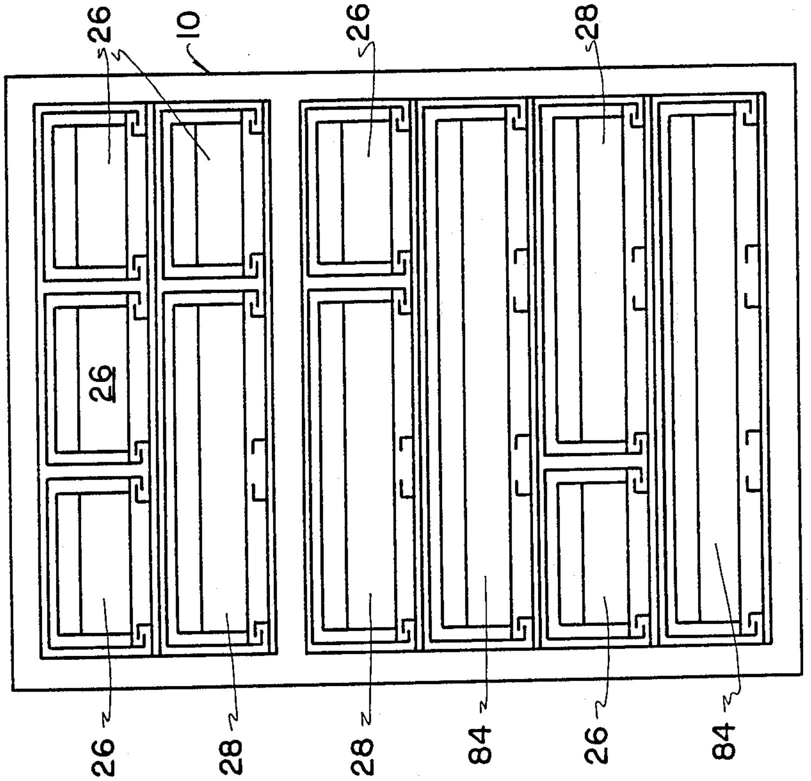
Figure 9:
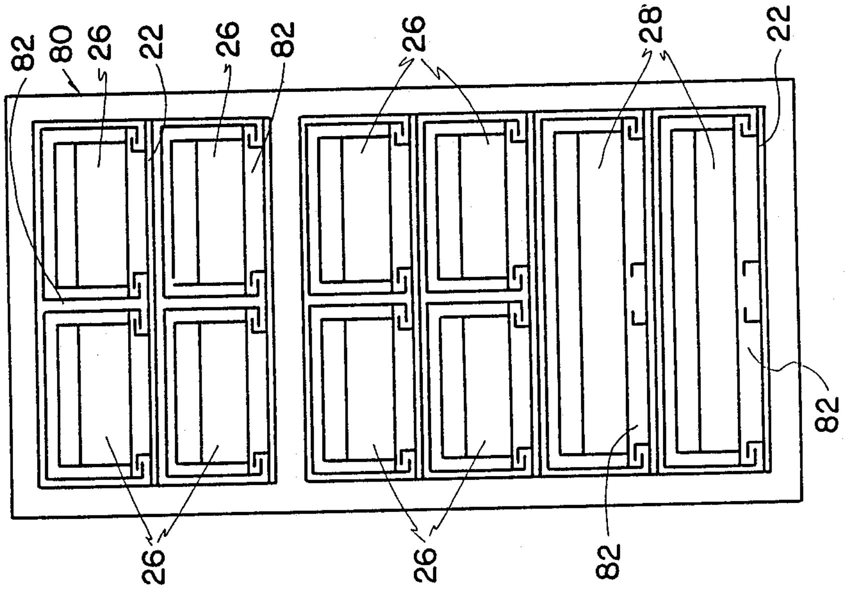

Embodiments of two different cabinets according to the invention are described below in connection with the accompanying drawings in which FIG. 1 is a front view of a first cabinet with an upper, uncooled space and a lower cooled space, FIG. 2 is a sectional view along the line II—II of FIG. 1 with a door covering the front of the cabinet, FIG. 3 is a perspective view of a magazine of a narrow type to be inserted into the cabinet, FIG. 4 is a perspective view of a magazine of a wide type to be inserted into the cabinet, FIG. 5 is a part of a connection for transmission of a signal from a magazine to a control device, FIG. 6 is a longitudinal sectional view of a magazine, FIG. 7 is the same front view as FIG. 1 with narrow and wide magazines inserted into the cabinet, FIG. 8 is a detail of FIG. 2, with a magazine locked to the cabinet, FIG. 9 is a front view of a second cabinet, narrower than the first one, with magazines of the narrow and the wide type inserted into the cabinet, and FIG. 10 is the same front view as FIG. 1 with magazines of the narrow and the wide type and magazines of a still wider type inserted into the cabinet.

In FIGS. 1 and 2, the reference numeral 10 designates a cabinet that has an upper, uncooled space 12 and a lower, cooled space 14. The spaces 12 and 14 are closable by a common door 16 having a heat insulating part 18 in front of the space 14. The space 14 is, moreover, surrounded at the top, at the bottom, at the back and on the sides by heat insulating walls 20. The space 12 contains two identical shelves 22, the lowest of them resting on the bottom of the space 12. The space 14 contains four of those shelves 22, the lowest of them resting on the bottom of the space 14. The shelves 22 divide the space 12 into two compartments 24, and the space 14 into four compartments 24.

Each compartment 24 is arranged so that it can accommodate either three narrow magazines 26, see FIG. 3, along side of each other or a narrow and a wide magazine 28, see FIG. 4, along side of each other. In FIG. 7 compartment No. 1 counted from the top, is shown to contain three narrow magazines, whole compartment No. 2 illustrates a wide and a narrow magazine, compartment No. 3 show a wide and a narrow magazine, compartment No. 4 illustrates three narrow magazines, whole compartment No. 5 a narrow and a wide magazine, and compartment No. 6 a narrow and a wide magazine.

As seen in FIG. 6, the magazines 26 and 28, respectively, show an opening 30 for refilling of articles 32 being put on an inclined bottom surface 34 which makes the articles move by gravity towards a discharging device comprising a flap 38 rotatable about an axis 36. When an article 32 is to be taken out of the magazine, the flap 38 is turned forward to the position marked with dash-dotted lines, as shown in FIG. 6, and the article moves along with the flap, the rear edge 40 of which simultaneously preventing the next article 32 from being removal from the magazine.

Each shelf 22 is provided with three pairs of angle rails 40, 42 and 44 arranged to engage with angle rails 46 of each magazine 26 or 28 the narrow magazine 26 is arranged to be guided by its rails 46 into the compartment 24 by means of one of the angle rail pairs of the shelf and the wide magazine 28 is arranged to be guided by its rails 46 into the compartment 24 by means of the outer rails of two adjacently located angle rail pairs of the shelf. The angle rails 40, 42 and 44 of the shelf 22 prevent each magazine 26 or 28 from moving laterally as well as vertically relative to the shelf 22 as appears from FIG. 7.

The magazines 26 and 28 are locked in the compartments 24 by means of hooks 48 arranged to be rotatable around axes 50. The hooks 48 are arranged just in front of openings 52 of the magazines 26 and 28 and latch on an edge of the opening 52 when a magazine is pushed into its compartment, as shown in FIG. 8. Several hooks 48 are connected to a common bar 54 displaceable in vertical direction by a motor 56 (FIG. 2). When the magazines 26, 28 shall be taken out of the cabinet for refilling of new articles the motor 56 is first activated so that the bar 54 is pressed down, the hooks 48 being lifted and released from the magazines which then can be pulled out of the cabinet.

The axis 36 of each magazine 26, 28 is connected with an arm 58 which is, in its turn, connected with a bar 60. The bar 60 is arranged to influence an electric switch 62 with two contact pins 64. In the cabinet 10 electric socket-contacts 66 are arranged into which the pins 64 are introduced when the magazines 26, 28 are pushed into their compartments 24. The sockets 66 are connected to a cotnrol device 68 via a conduit 70.

The cabinet 10 is used in the following way: First of all, the door 16 is opened after which all magazines become accessible as shown for example in FIG. 7. The user then takes out an article from one magazine and turns the flap 38 of this magazine from the position shown in FIG. 3 to that shown in FIG. 4 and removes the article. Thereby the arm 58 will turn with the flap 38 causing the bar 60 to move in relation to the switch 62 and influence the latter to switch on a current through the conductors 70 by which the control device 68 receives a signal that an article has been taken out of the magazine.

The cabinet 10 can be located in a hotel room and the control device 68 at the reception of the hotel. The control device should preferably be arranged to registrate all removals from the cabinet so that the cabinet does not need to be inspected and taken stock of in the hotel room when the charge for articles taken out is determined.

Articles that have been removed are then replaced by the hotel staff who releases the magazines 26, 28 by activating the motor 56 and pulls out the magazines from the cabinet. Then new articles can be replaced through the opening 30. The magazines 26, 28 are then pushed into the cabinet again and locked to it by means of the hooks 48.

According to FIG. 9 the cabinet 80 can be made narrower so that each compartment 82 is arranged to accommodate either two narrow magazines 26 or one wide one 28 on shelves 22, which have been made correspondingly narrower.

The magazines might even be of a still wider type. In FIG. 10 two such wider magazines 84 are shown installed in the cabinet according to FIG. 1 instead of three narrow ones or one narrow and one wide one.

I claim:

1. In a vending machine cabinet (10,80) for supplying different-sized articles (32), the cabinet including:

a plurality of compartments (24,82) arranged in the cabinet;

a plurality of magazines (26, 28, 84) for the articles, which magazines are located in the compartments, each respective magazine being removable through a front opening of the cabinet for refilling of new articles and being provided with a discharging device (38) for removing of articles;

locking means (48, 52) for keeping the magazines locked within the compartments;

means (54, 56) for simultaneously releasing a plurality of magazines from their respective locking means (48, 52) so that the magazines can be removed from the cabinet;

a centrally located control device (68) for registering all removals of articles through the discharging devices (38);

signal transferring means (58, 60, 62, 64, 66, 70) for transferring a signal from the respective discharging device (38) to the control device (68) signalling that an article (32) has been removed through the discharging device (38); and first signal connecting means (66) arranged in the respective compartment and second signal connecting means (64) arranged on the respective magazine, said first and second signal connecting means comprising a link (64, 66) in said signal transferring means (58, 60, 62, 64, 66, 70) and transferring the signal from the discharging device (38) to the control device (68) when the magazine is located in its compartment;

the improvement wherein the magazines are of at least one narrow (26) and one wide (28) type, each compartment (24, 82) being arranged to be able to accommodate at least two narrow magazines (26) beside each other and so that, alternatively, at least two of the narrow magazines (26) can be replaced by one wide one (28), the width of which is substantially equal to the total width of the magazines it replaces, guide means (40, 42, 44) being arranged in the compartments to guide the magazines to fixed positions in the compartments, and each compartment being provided with at least two of said first signal connecting means (66), which are located at a distance form each other in the width direction of the compartment at fixed positions so that the second signal connecting means (64) of the magazines are connected to the first signal connecting means (66) when the magazines are inserted into the compartments guided by the guide means (40, 42, 44).

2. A vending machine cabinet as claimed in claim 1 wherein each compartment is arranged for accommodating at least three narrow magazines juxtaposed to each other and two of said narrow magazines are capable of being replaced by a single wide magazine.

3. A vending machine cabinet as claimed in claim 1 wherein each compartment is arranged for accommodating at least three narrow magazines juxtaposed to each other and that said three narrow magazines can be replaced by a single wide magazine.

* * * * *